(12) United States Patent
Omar et al.

(10) Patent No.: US 6,449,090 B1
(45) Date of Patent: Sep. 10, 2002

(54) THREE DIMENSIONAL DISPLAY VIEWABLE IN BOTH STEREOSCOPIC AND AUTOSTEREOSCOPIC MODES

(75) Inventors: Basil Arthur Omar; Graham John Woodgate; David Ezra, all of Oxfordshire (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 08/592,812

(22) Filed: Jan. 26, 1996

(30) Foreign Application Priority Data

Jan. 28, 1995 (GB) .............................. 9501692

(51) Int. Cl.[7] .................. G02B 27/26; G02B 27/22; H04N 15/00
(52) U.S. Cl. .................. 359/465; 359/464; 348/51; 348/58
(58) Field of Search .................. 359/465, 464, 359/462; 348/51, 58

(56) References Cited

U.S. PATENT DOCUMENTS

| 5,029,980 A | * | 7/1991 | Perisic | 359/465 |
| 5,132,839 A | * | 7/1992 | Travis | 359/464 |
| 5,264,964 A |   | 11/1993 | Faris | 359/465 |

FOREIGN PATENT DOCUMENTS

| DE | 4123895 | 1/1993 | | |
| EP | 505982 A2 | * | 9/1992 | 359/465 |
| EP | 0540137 | 5/1993 | | |
| EP | 0602934 | 6/1994 | | |
| EP | 0656555 | 6/1995 | | |

OTHER PUBLICATIONS

Search Report for European Appl. 96300551.7, mailed Sep. 24, 1996.
Partial European Search Report for European Patent Application #96300551.7 mailed Jun. 18, 1996.
Search Report for UK. Appl. 9501692.9, mailed Mar. 30, 1995.

* cited by examiner

*Primary Examiner*—Jon Henry
(74) *Attorney, Agent, or Firm*—Renner, Otto, Boisselle & Sklar

(57) ABSTRACT

A three dimensional display is provided which can. operate in an autostereoscopic mode, requiring no viewing aid, and a stereoscopic mode, requiring a viewing aid such as polarized spectacles. In the autostereosocopic mode, light from illuminators is imaged by lenses through LCD display panels at regions where the left and right eyes of an observer are located. Thus, a two dimensional image displayed on one panel is visible to the right eye of the observer whereas a two dimensional image displayed by the other panel to visible to the left eye of the observer. In the stereoscopic mode, light from the illuminators through the LCD panels is visible throughout an extended region by both eyes of the observer. However, the light from the panels is polarized in mutually perpendicular directions and the spectacles comprise polarizers for the left and right eyes which substantially pass only light corresponding to the left and right images, respectively.

2 Claims, 19 Drawing Sheets

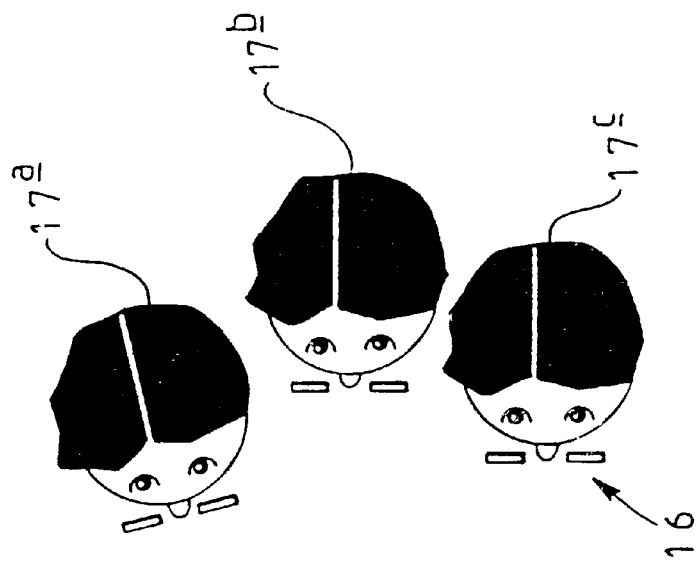
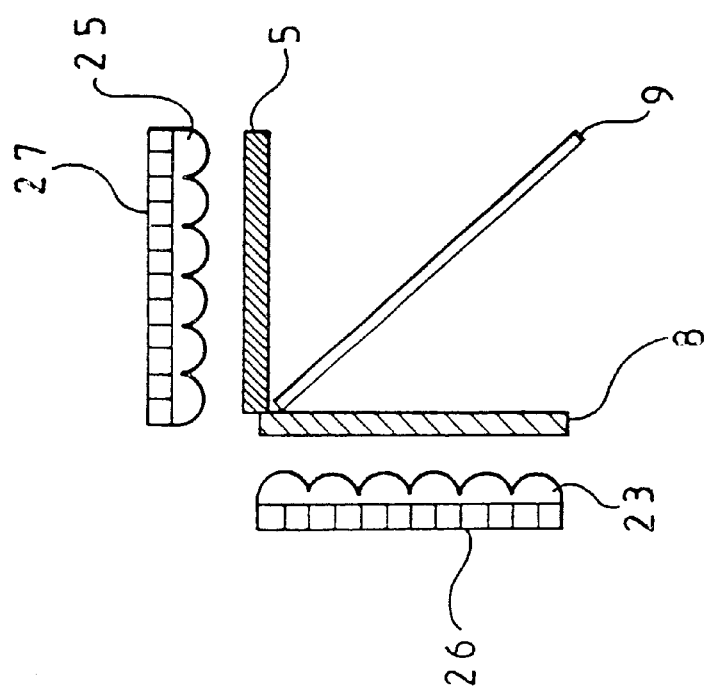
FIG 9

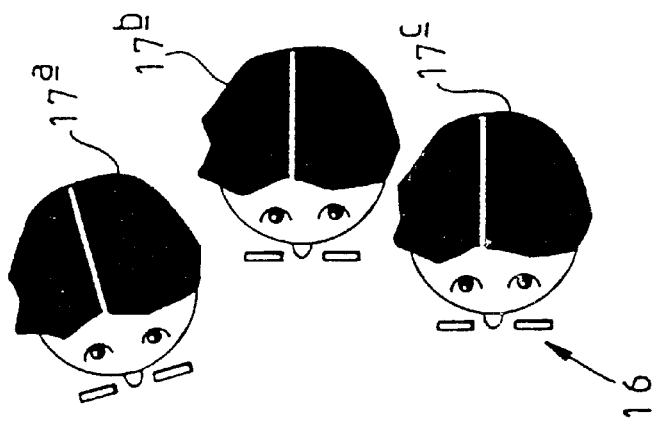
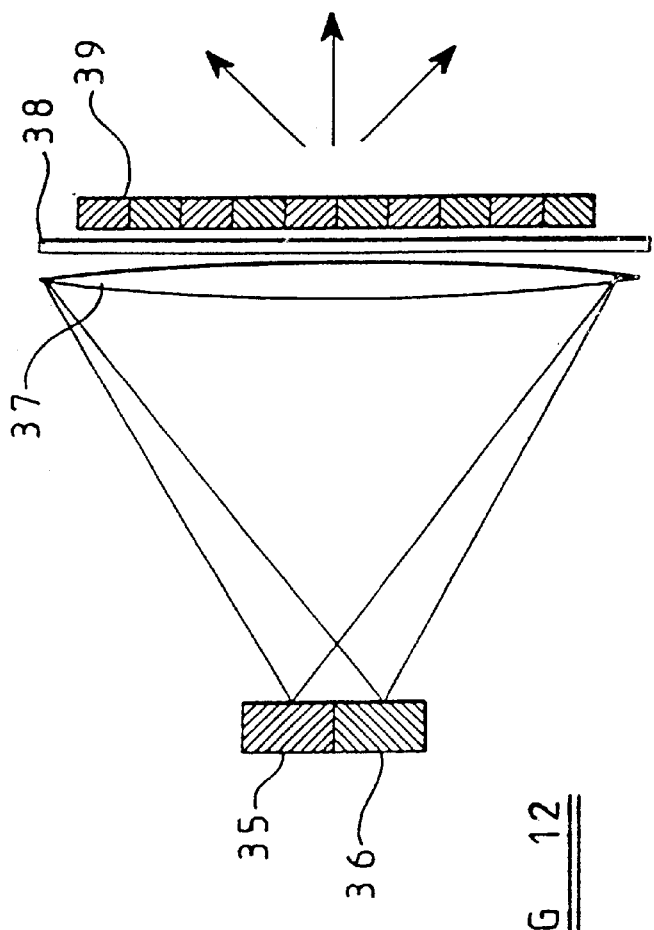
FIG 12

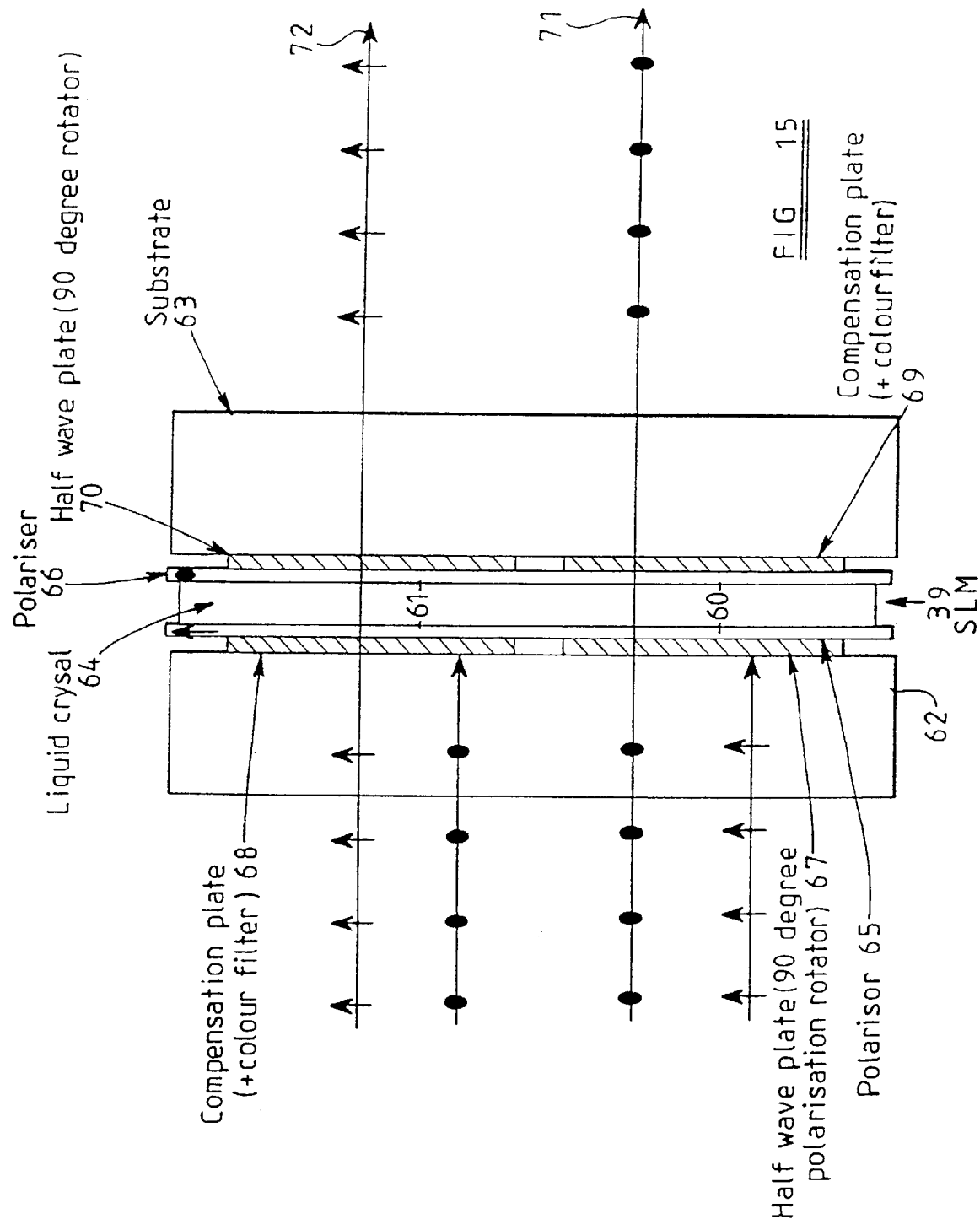

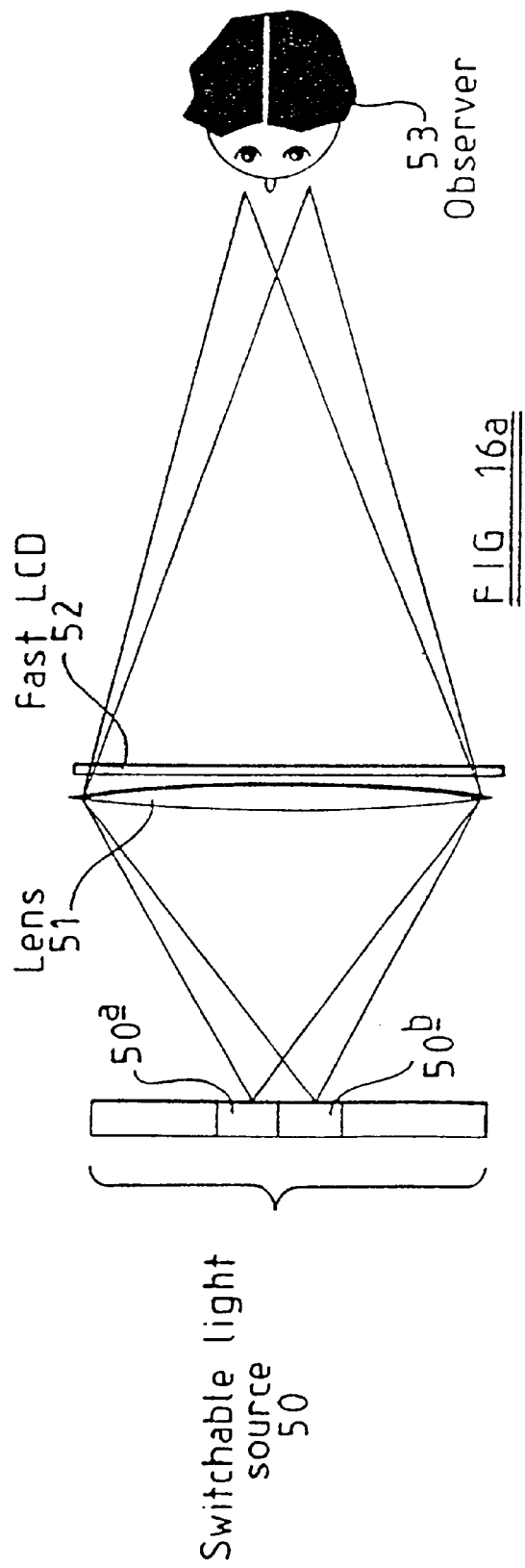

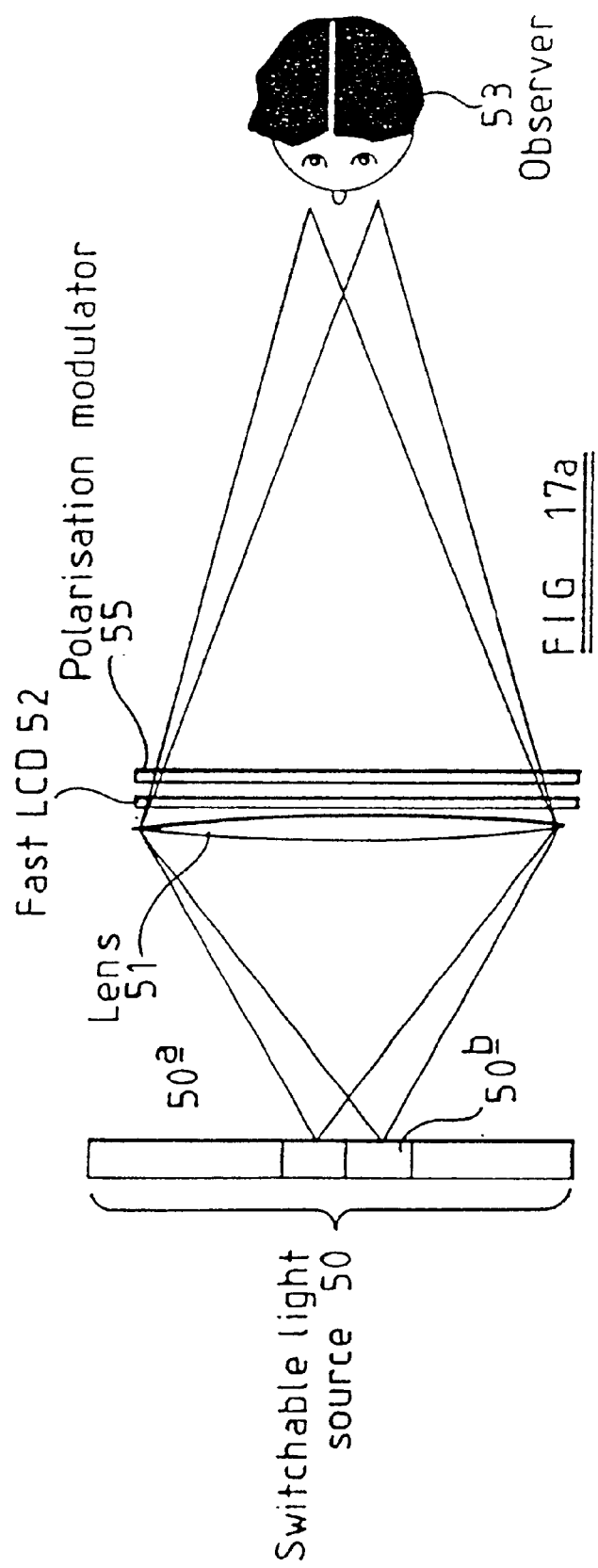

THREE DIMENSIONAL DISPLAY VIEWABLE IN BOTH STEREOSCOPIC AND AUTOSTEREOSCOPIC MODES

The present invention relates to three dimensional displays.

The term "autostereoscopic" as used herein is defined to mean providing parallax information without requiring the use of a viewing aid. The term "stereoscopic" as used herein is defined to mean providing parallax information with a viewing aid.

FIG. 1 of the accompanying drawings shows an autostereoscopic display of the type disclosed in EP-A-0 602 934. Light from an illuminator 1 is equally divided by a beam splitter 2, for instance comprising a partially silvered mirror, between transmitted and reflected beams. The transmitted beam is reflected by a mirror 3 via a lens 4 and through a spatial light modulator (SLM) in the form of a liquid crystal display (LCD) panel 5. The reflected beam is similarly reflected by a mirror 6 through a lens 7 and an SLM 8 in the form of an LCD panel. A beam combiner 9, for instance comprising a partially silvered mirror, reflects light from the LCD panel 5 and transmits light from the LCD panel 8. The lenses 4 and 7 form images of the illuminator 1 at respective viewing zones where the eyes of an observer 10 are located. Thus, the left eye of the observer 10 sees an image formed on the LCD panel 8 whereas the right eye sees an image formed on the LCD panel 5. By displaying suitable two dimensional images on the panels 5 and 8 representing views of an object taken from different directions corresponding to the eyes of an observer, the observer 10 sees a three dimensional image which is autostereoscopic i.e. no viewing aids are required.

The display shown in FIG. 1 makes good use of the light provided by the illuminator 1 so as to provide a relatively bright three dimensional image to the observer 10. However, because the autostereoscopic imaging is based on imaging of the illuminator 1 at positions corresponding to the eyes of the observer 10, the autostereoscopic three dimensional image is viewable in a relatively limited region of space so that the observer 10 has a limited freedom of location.

FIG. 2 of the accompanying drawings shows another autostereoscopic three dimensional (3D) display of the type disclosed in EP 0 656 555. The display shown in FIG. 2 is of the same general type as that shown in FIG. 1 in that it uses a beam combiner 9 to combine two dimensional images and effectively a single illuminator whose light is divided by a beam splitter 2. However, the display of FIG. 2 differs from that shown in FIG. 1 in that the fixed relatively small illuminator 1 is replaced by a programmable illuminator 11 which provides or simulates a movable light source. The illuminator 11 is controlled by an observer tracking system 12 which determines the location of an observer and controls the illuminator 11 so that the images of the illuminator are formed at the current locations of the eyes of the observer. As illustrated in FIG. 2, the illuminator 11 comprises a plurality of light emitting areas which are controlled so as to simulate a moving light source. When the observer is at the location indicated at 10a, the portion 11a of the illuminator 11 is illuminated whereas, when the observer is at the position indicated at 10b, the portion 11b of the illuminator 11 is illuminated.

It is thus possible to provide an autostereoscopic display in which the observer can be tracked within a more extended region within which the 3D image is viewable. By tracking more than one observer and controlling the illuminator 11 such that more than one corresponding region is illuminated, it is possible to arrange for the 3D image to be viewable by more than one observer. However, the viewing region may still be undesirably limited and only a limited number of observers can be accommodated. Further, the complexity and cost of the display are increased by the provision of the observer tracking system 12.

U.S. Pat. No. 5,264,964 discloses an imaging system which is capable of operating in both stereoscopic and autostereoscopic modes, which are illustrated in FIGS. 3 and 4, respectively, of the accompanying drawings. A spatially multiplexed stereoscopic image formed of alternating left eye view strips L and right eye view strips R is disposed below micropolarising arrays PA1, PA2 and PA3. Polarisers having a first linear polarisation direction are denoted by P1 whereas polarisers having a second linear polarisation direction orthogonal to the first linear polarisation direction are denoted by P2. Transparent non-polarising regions are denoted by T. Polarisers P1 of the array PA1 are disposed on the strips L whereas polarisers P2 of the array PA1 are disposed on the strips R.

The arrays PA2 and PA3 are spaced from the array PA1 and each comprises a repeating pattern of regions P1, P, P2. In the stereoscopic mode illustrated in FIG. 3, regions of the same type of the arrays PA2 and PA3 are aligned with each other. In the autostereoscopic mode illustrated in FIG. 4, polarising regions of different types of the arrays PA2 and PA3 are aligned with each other to provide opaque regions which alternate with the transparent regions T to form a parallax barrier.

The arrays PA2 and PA3 are moved relative to each other to change between the stereoscopic and autostereoscopic modes.

As shown in FIG. 3; light is transmitted in regions A from the strips R via the transparent regions T to the right eye of an observer. In regions B, light is transmitted from the strips R via regions P2 of the arrays PA2 and PA3 to the right eye. Because of differences in transmissivity between the regions T and P2, the image portions viewed via the regions B will be darker than the image portions viewed via the regions A. In region C, light from the strip R2 towards the right eye is absorbed by the orthogonal polarisers P1 and P2 so that a dark band with be visible in the image. In regions D, light from the strips L towards the right eye is absorbed by the orthogonal polarisers so that the left eye view strips are not visible to the right eye.

Light from the strip R1 is mostly transmitted to the right eye whereas light from the strip R2 is mostly blocked from the right eye. Similar effects occur for the left eye of the observer. Thus, different parts of the same view have different intensities when seen by the observer. Further, the pars of the views at least partially obscured by orthogonal polarisers change for different positions of the observer so that intensity fluctuations are seen across the display as the observer moves.

In the autostereoscopic mode illustrated in FIG. 4, there is a problem with the size of the slit width of the parallax barrier. For a slit width equal to the barrier width and for a typical position of the observer as shown, the right eye sees a right eye view strip R3 via a region E but also sees part of a left eye view strip L1 via a region F. The left eye sees only part of the strip L1 via a region G but sees the right eye view strip R4 via a region H. A substantial amount of cross-talk is therefore visible in the image.

The amount of cross-talk varies with the angle between the display and the eyes of the observer so that, for each position of the observer, different parts of the display exhibit different levels of cross-talk. Also, as the observer moves, the amount of cross-talk seen by each eye varies.

In order to reduce the cross-talk, the slit width may be made narrow. However, this results in a deterioration of image quality in the stereoscopic mode. Thus, for the display to operate in both the autostereoscopic and stereoscopic modes, conflicting demands on the slit width result in poor image quality in both modes or in the image quality in one mode being sacrificed for the image quality in the other mode.

A further disadvantage with the system disclosed in U.S. Pat. No. 5,264,964 is the tight alignment tolerances required of the micropolariser arrays. Substantial cost and difficulty of manufacture are necessary in order to provide the required tolerances.

According to a first aspect of the invention, there is provided a display as defined in the appended claim 1.

According to a second aspect of the invention, there is provided a display as defined in the appended claim 23.

Preferred embodiments of the invention are defined in the other appended claims.

It is thus possible to provide a 3D display which can be operated in an autostereoscopic mode, which does not require any viewing aids, or in a stereoscopic mode, which does require viewing aids such as suitable polarised spectacles to be worn by an observer. In the autostereoscopic mode, a relatively bright image can be provided but is viewable in only a relatively limited viewing region. In the stereoscopic mode, although the image may be less bright for the same illumination power, the 3D image is viewable over a substantially extended region. This provides a much larger freedom of observer location and allows more than one observer to view the display without the requirement for observer tracking. Good image quality is provided in both modes and no extraordinary manufacturing tolerances are required.

It is also possible to provide an autostereoscopic display exhibiting reduced cross-talk between left and right images.

Displays of this type may be used, for instance, in 3D television, 3D computer aided design and graphics, 3D medical imaging, virtual reality, and computer games.

The invention will be further described, by way of example, with reference to the accompanying drawings, in which.

Figure 7:
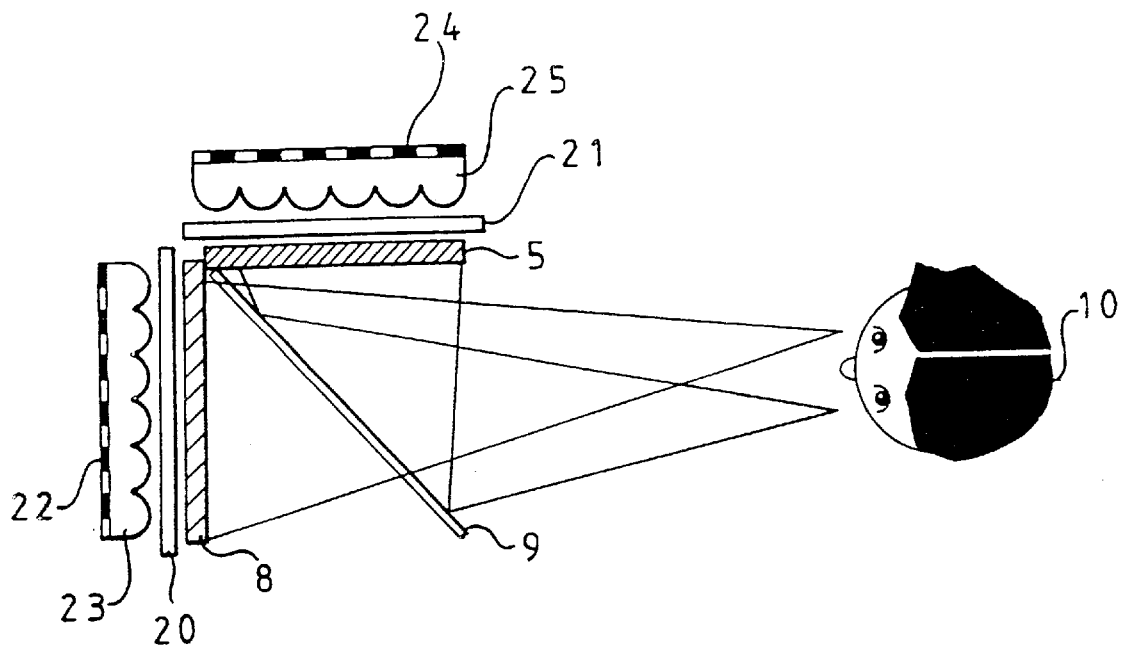
Figure 8:
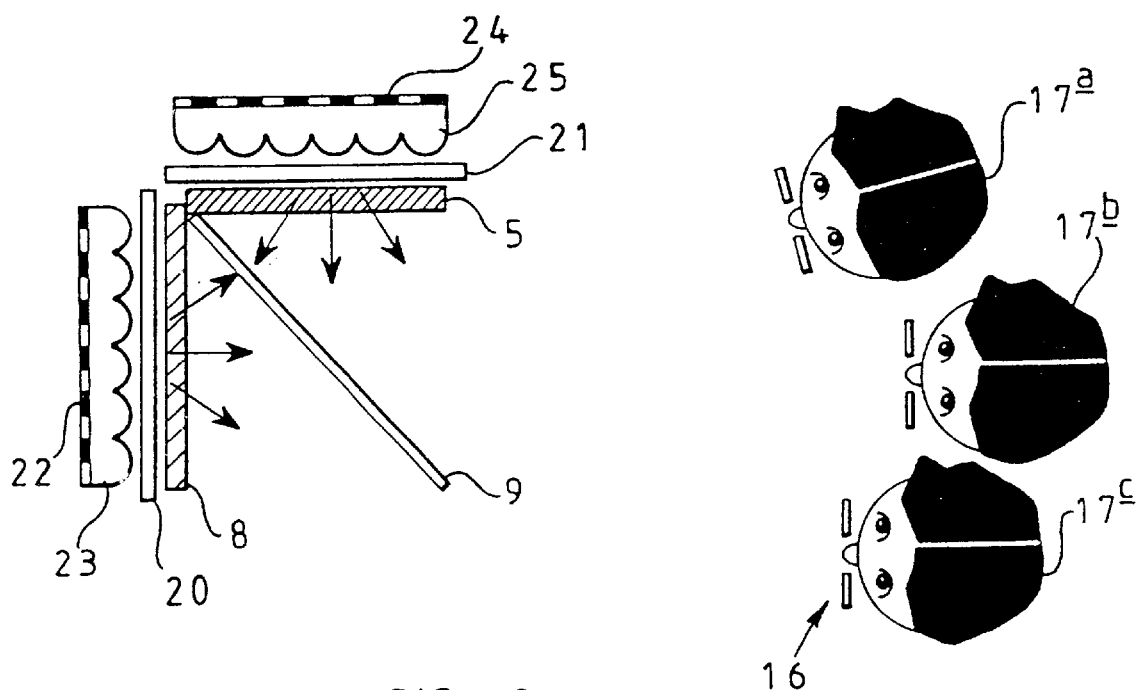
Figure 10:
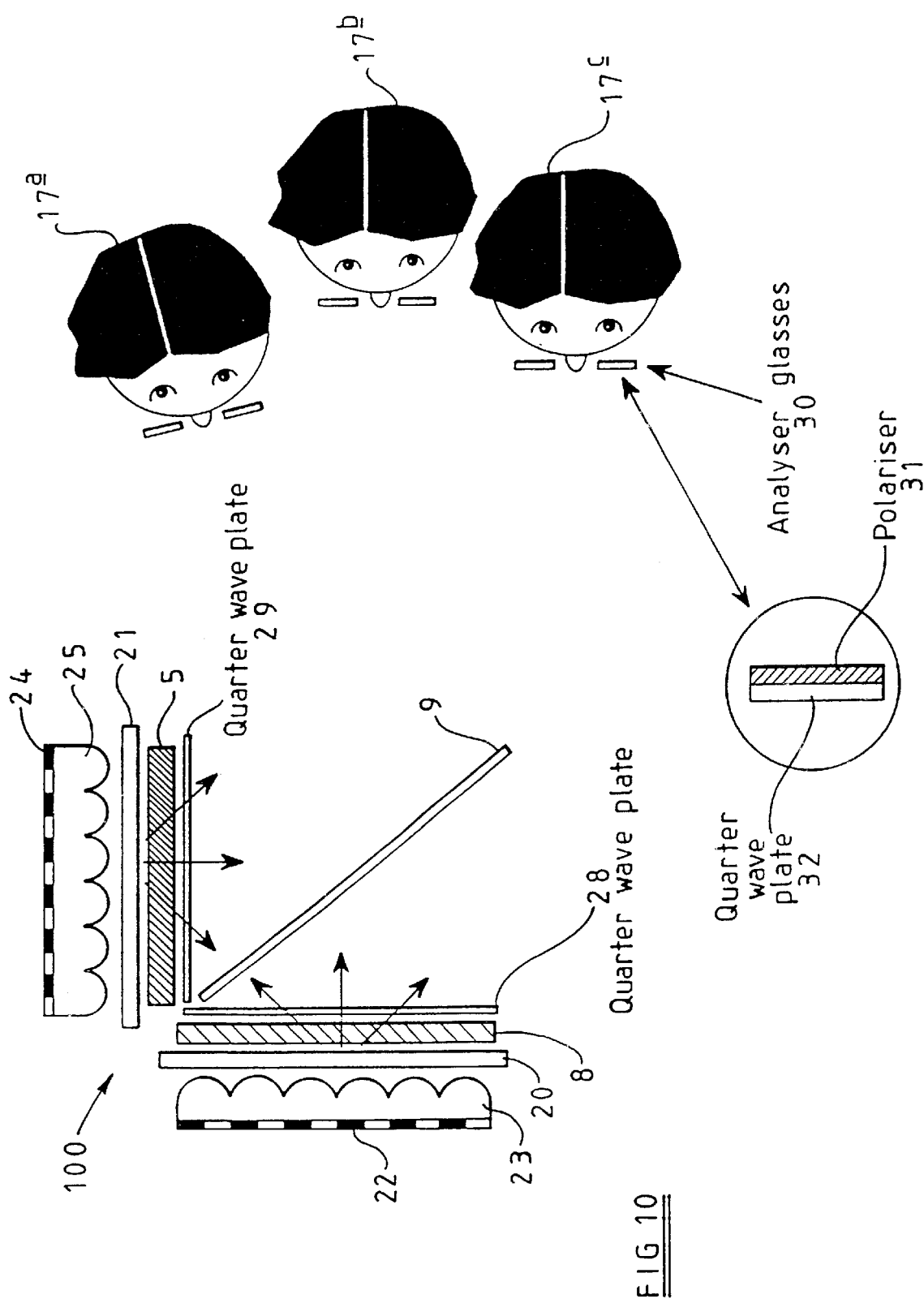
Figure 11:
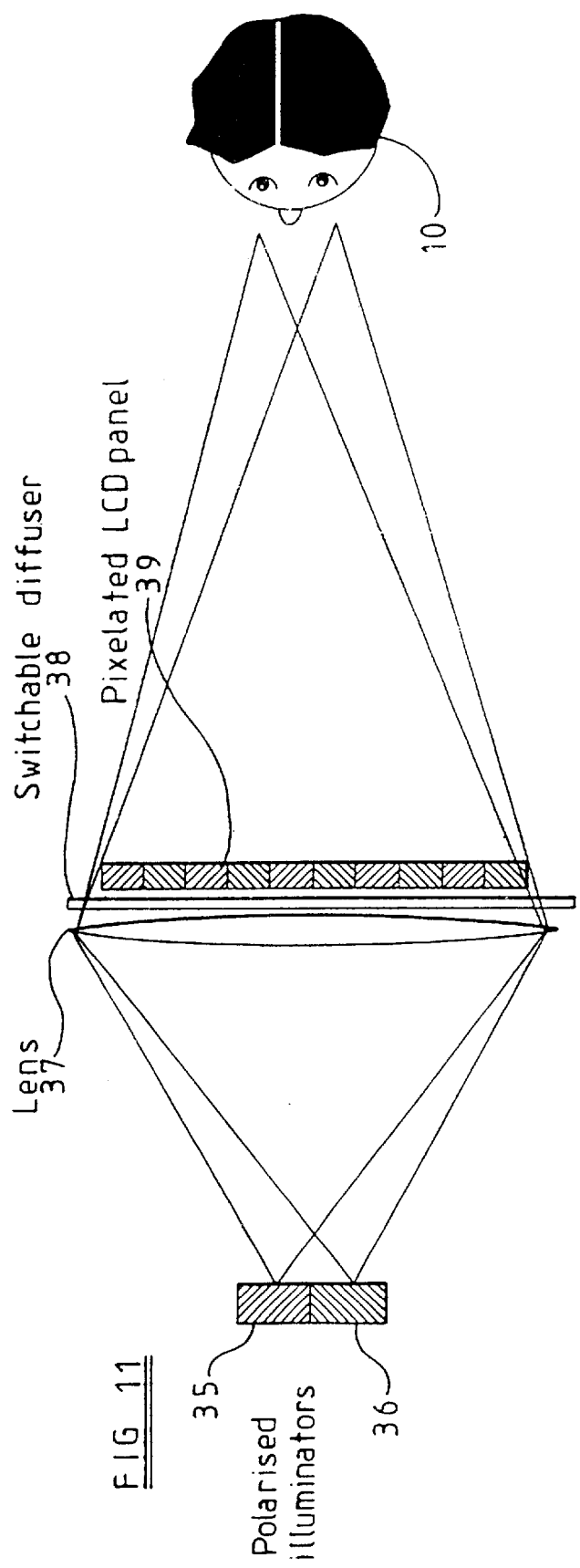
Figure 13:
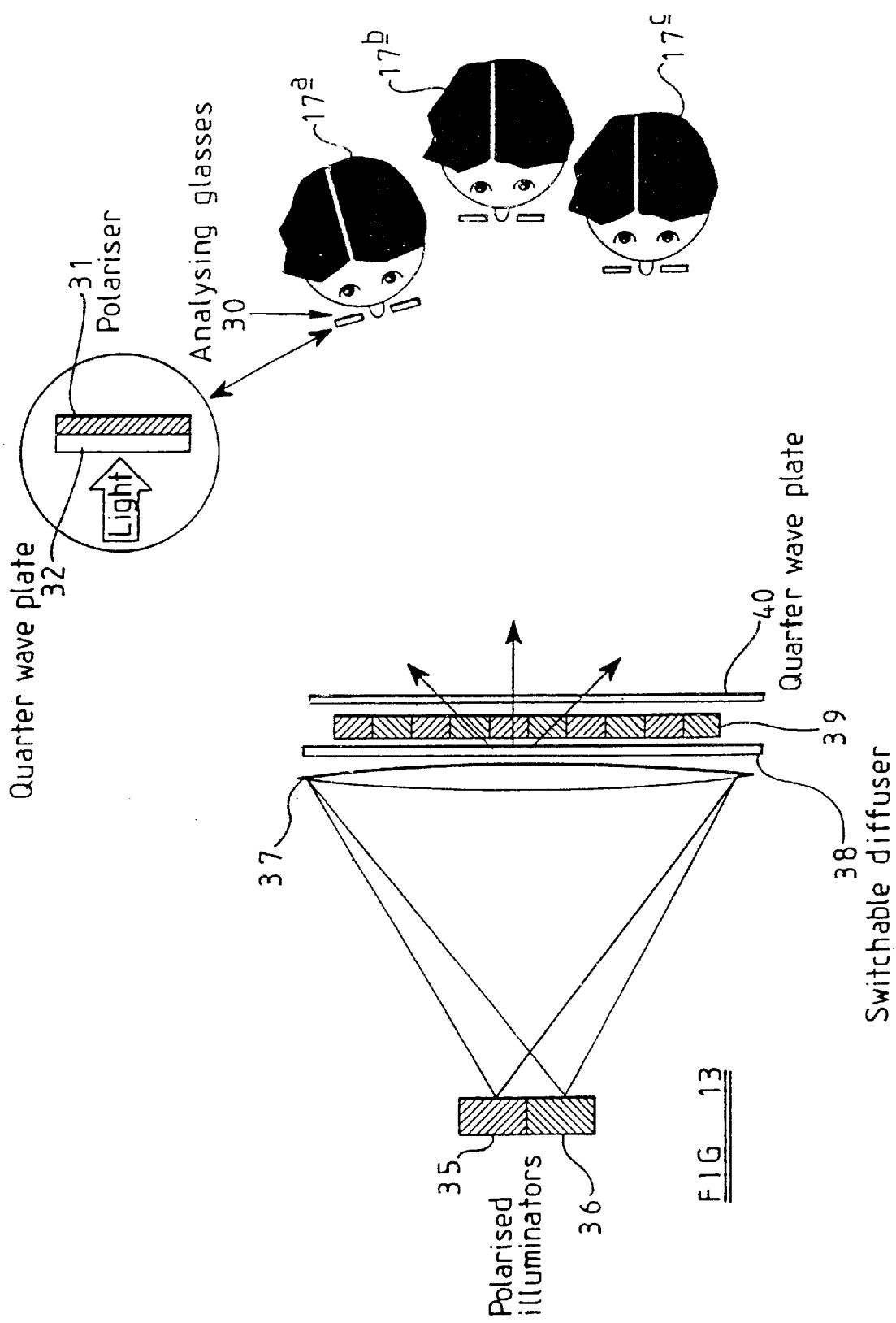
Figure 14:
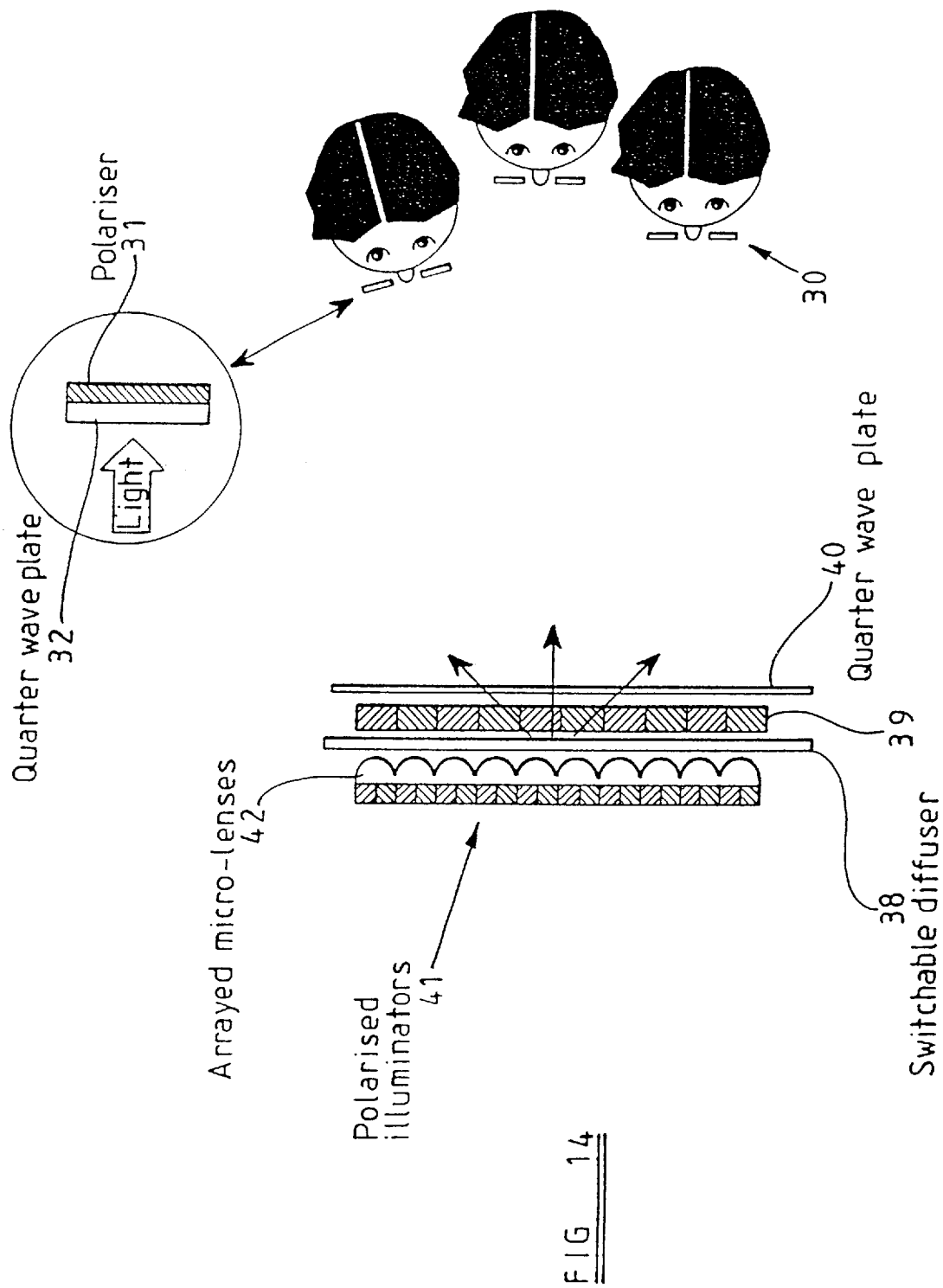
Figure 16B:
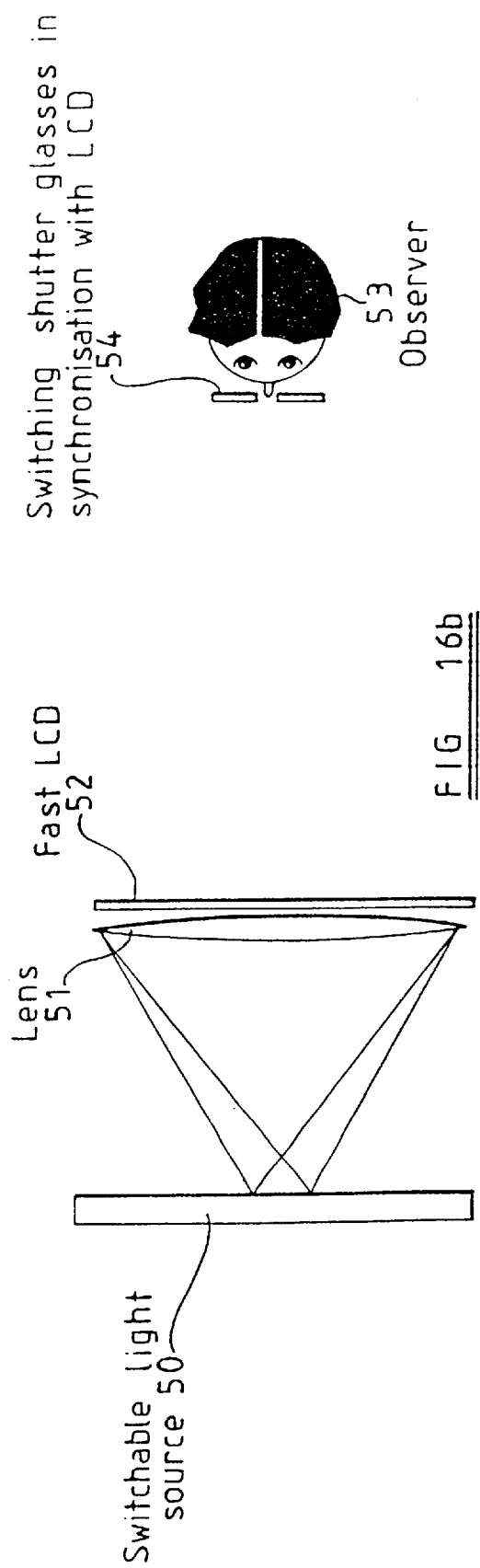
Figure 17B:
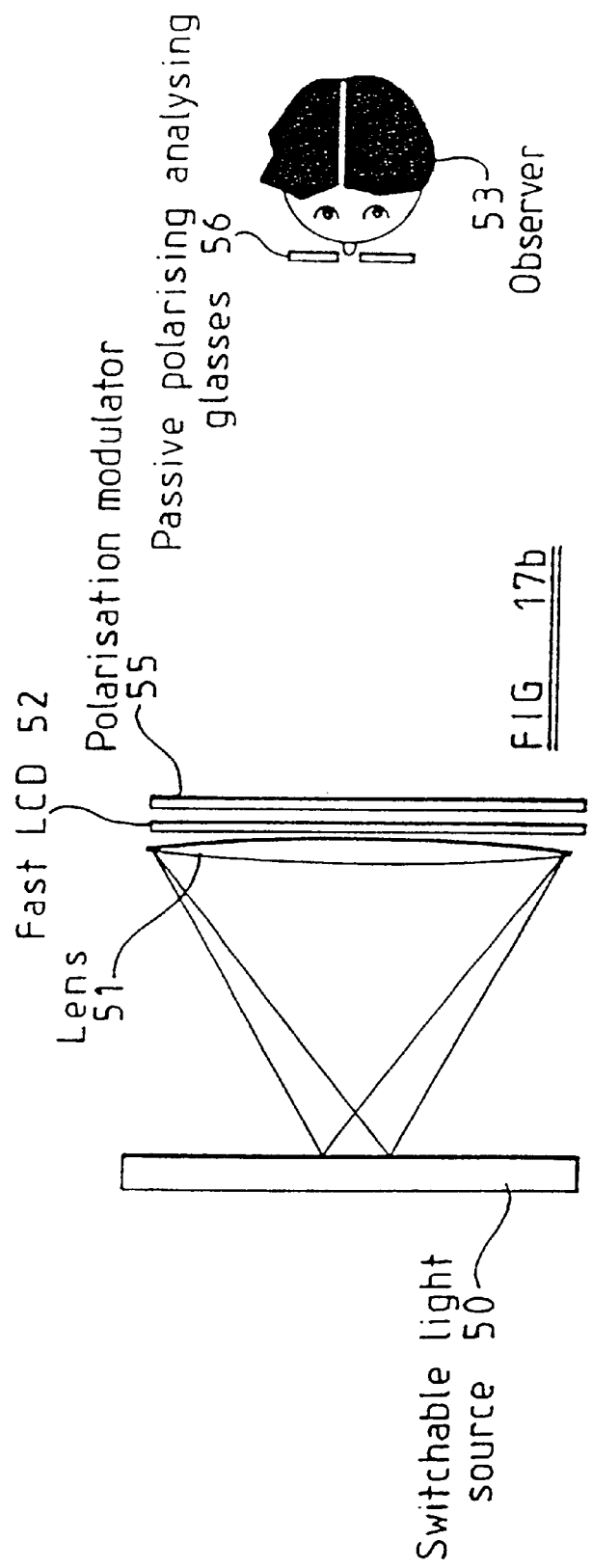
Figure 18:
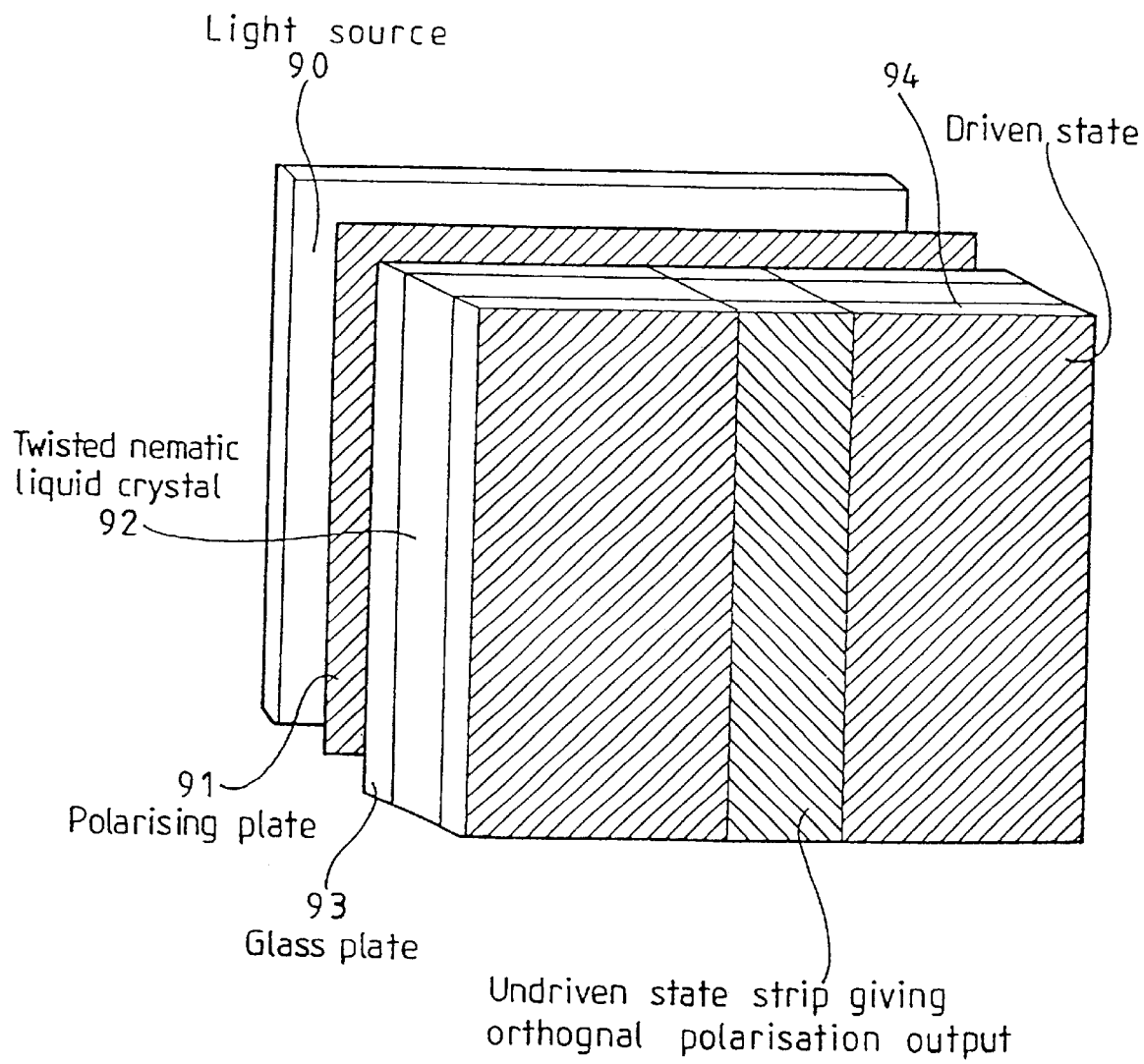

FIG. 7 view of a 3D display constituting a third embodiment of the invention operating in an autostereoscopic mode;

FIG. 8 is a diagrammatic view of the display of FIG. 7 operating in a stereoscopic mode;

FIG. 9 is a diagrammatic view of a 3D display constituting a fourth embodiment of the invention;

FIG. 10 is a diagrammatic view of a 3D display constituting a fifth embodiment of the invention;

FIG. 11 is a diagrammatic view of a 3D display constituting a sixth embodiment of the invention operating in an autostereoscopic mode;

FIG. 12 is diagrammatic view of the display of FIG. 11 operating in a stereoscopic mode;

FIG. 13 is a diagrammatic view of a 3D display constituting a seventh embodiment of the invention;

FIG. 14 is a diagrammatic view of a 3D display constituting an eighth embodiment of the invention;

FIG. 15 is a diagrammatic view of part of an SLM suitable for use in embodiments illustrated in FIGS. 11 to 14;

FIGS. 16a and 16b diagrammatic views of a 3D display constituting a ninth embodiment of the invention;

FIGS. 17a and 17b are diagrammatic views of a 3D display constituting a tenth embodiment of the invention; and FIG. 18 diagrammatic view of a backlight suitable for use in various of the displays disclosed herein.

Like reference numerals refer to like parts throughout the drawings.

Figure 2:
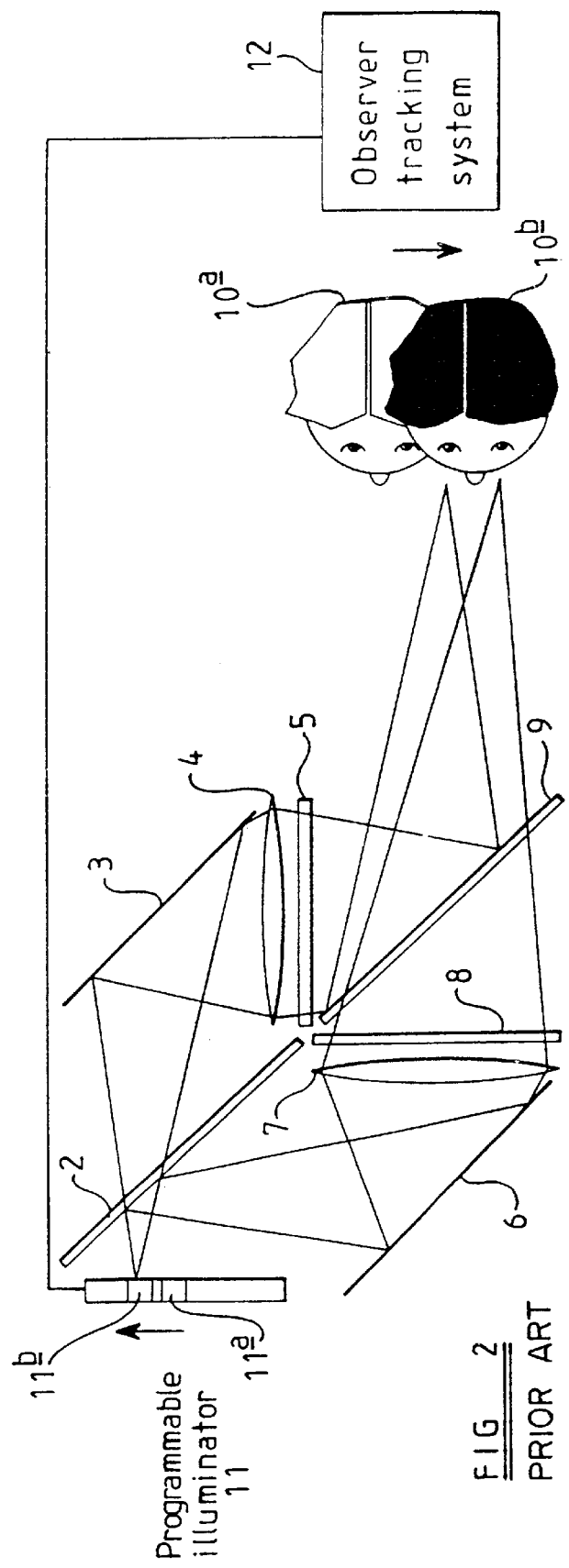
FIG. 2 is a diagrammatic view of a known type of 3D observer tracking display.
Figure 3:
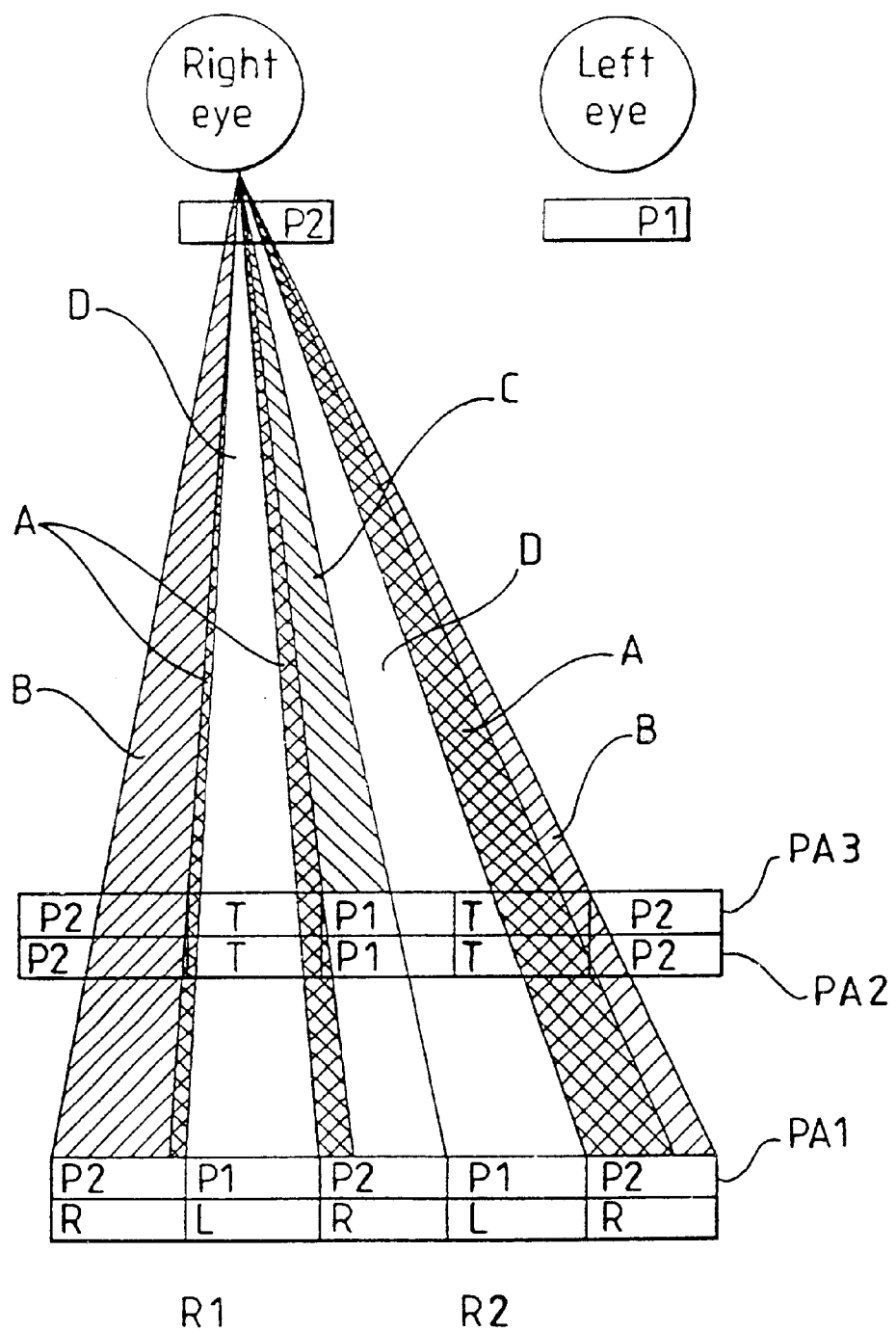
FIGS. 3 and 4 are diagrammatic views of another known type of 3D display operating in stereoscopic and autostereoscopic modes, respectively.
Figure 4:
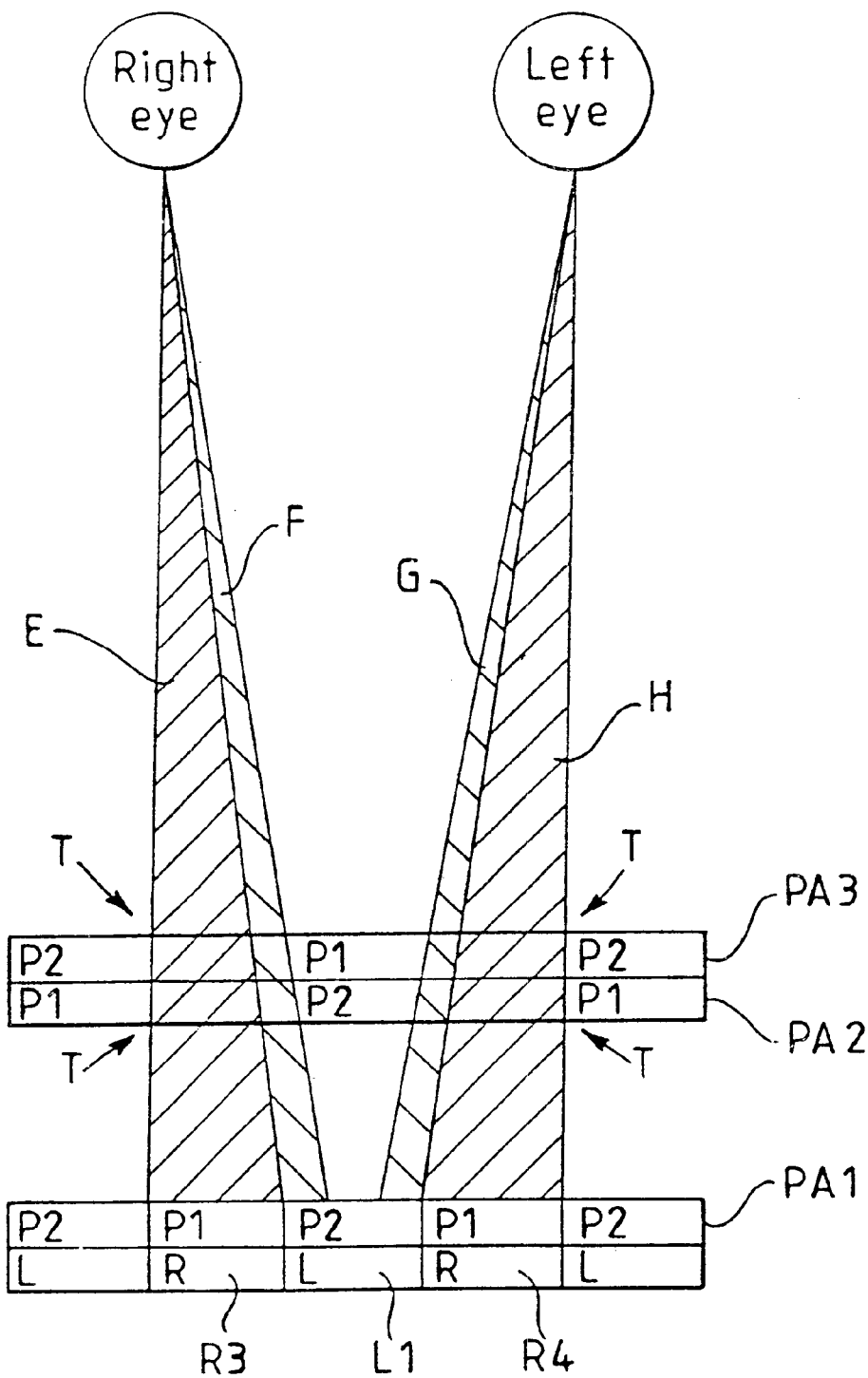
Figure 5:
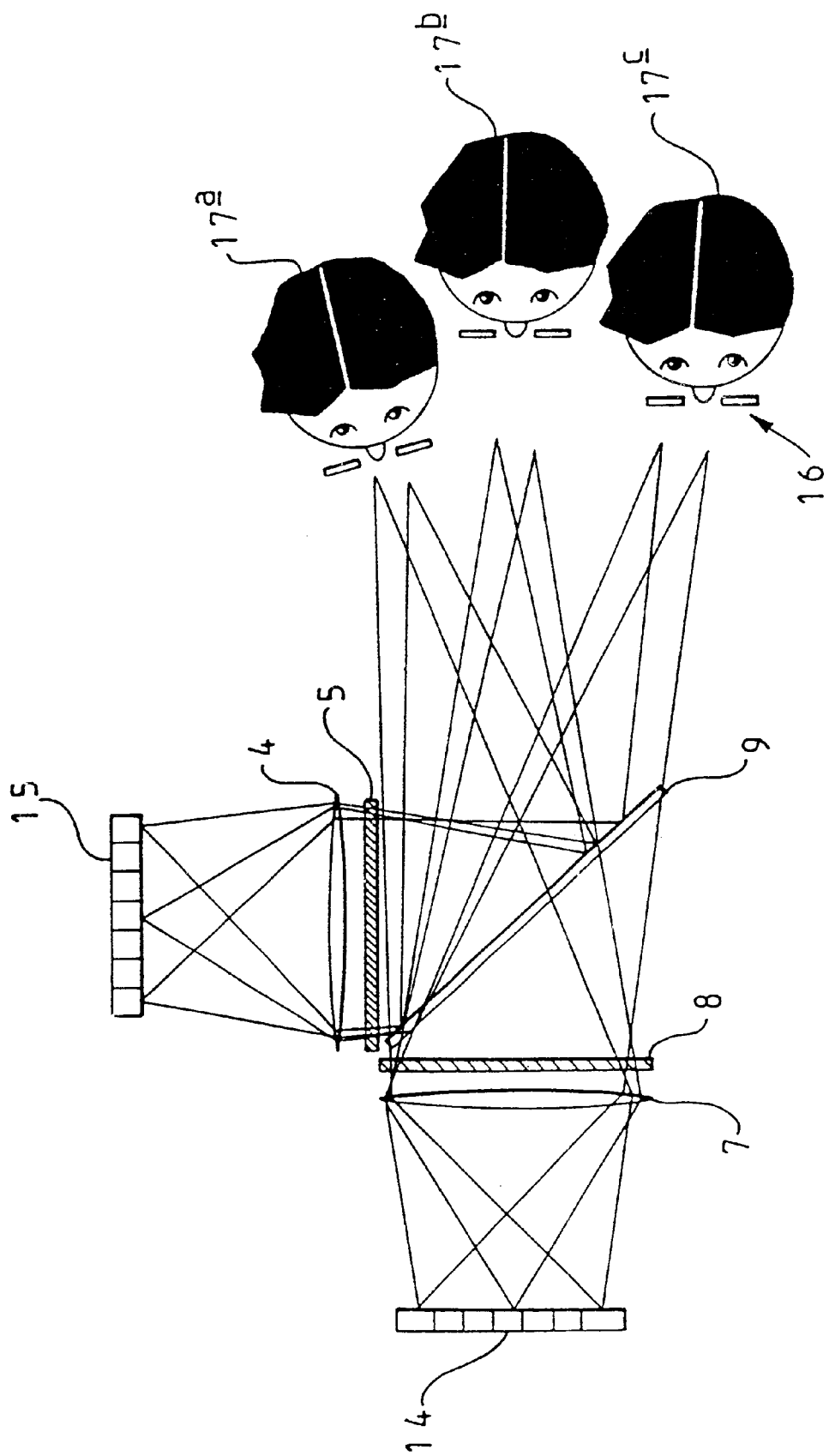
FIG. 5 is a diagrammatic view of a 3D display constituting a first embodiment of the invention.

FIG. 5 of the accompanying drawings shows a three dimensional display of a type similar to that shown in FIG. 2. In particular, the display comprises lenses 4 and 7, LCD panels 5 and 8, and a beam combiner 9. However, the illuminator 11, the beam splitter 2, and the mirrors 3 and 6 are replaced by two programmable illuminators 14 and 15, each of which is of the same type as the illuminator 11.

In the autostereoscopic mode of operation of the display shown in FIG. 5, part of each of the illuminators 14 and 15 is illuminated and is imaged by the lenses 4 and 7 through the LCD panels 5 and 8 and via the beam combiner 9 to a region at which the left and right eyes of the observer are located. In the autostereoscopic mode, the observer does not need to wear any viewing aids and perceives a three dimensional image provided his eyes are located in the respective regions at which the light emitting areas of the illuminators 14 and 15 are imaged.

Although the autostereoscopic mode provides a relatively bright 3D image, the observer has a limited freedom of movement within which the 3D image can be viewed. Although an observer tracking system of the type shown at 12 in FIG. 2 may be provided, this adds to the cost and complexity of the display and can permit only a limited number of observers to be able to see a 3D image at the same time.

In order to provide a more extended viewing range, the display of FIG. 5 may be operated in the stereoscopic mode as illustrated in the drawing. In this mode, the whole of each of the illuminators 14 and 15 is illuminated and the lenses 4 and 7 therefore provide a greatly extended image of each of the illuminators. This mode of operation takes advantage of the properties of the LCD panels 5 and 8, namely that the light transmitted by these panels is linearly polarised. The panels 5 and 8 are arranged such that light from the panel 8 for viewing by the left eye of the observer is linearly polarised in a first direction whereas light from the panel 5 arriving at the right eye of the observer is linearly polarised perpendicularly thereto.

In order to see the 3D image, the observer has to wear a viewing aid in the form of spectacles 16 comprising linearly polarising filters. The filter for the left eye is arranged to transmit light from the panel 8 and substantially to block light from the panel 5 whereas the polariser for the right eye is arranged to transmit light from the panel 5 and substantially to block light from the panel 8. Thus, the observer sees the left and right images displayed by the panels 8 and 5, respectively, with the left and right eyes, respectively. The 3D image is therefore viewable over a substantially extended region as indicated by the viewer positions 17a, 17b, and 17c in FIG. 5. Thus, several observers may simultaneously see the 3D image and each observer has much greater freedom of movement than in the autostereoscopic mode.

In this embodiment, the 3D images viewable by the observer are almost as bright in the stereoscopic mode as in the autostereoscopic mode, there being some light attenuation caused by the imperfect transmission properties of the spectacles 16 to the light with which their respective polarisations are aligned.

Figure 1:
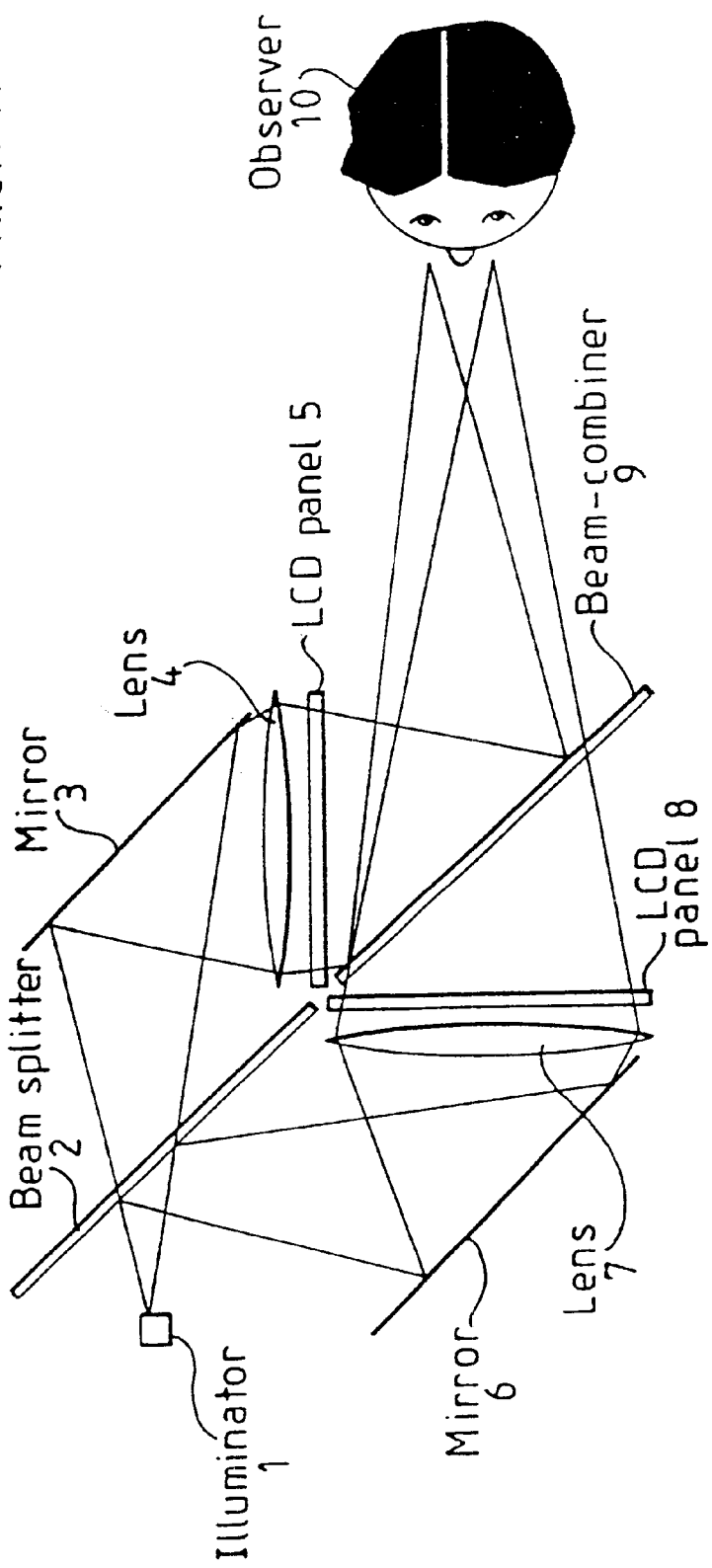
FIG. 1 is a diagrammatic view of a known type of 3D beam combiner display.
Figure 6:
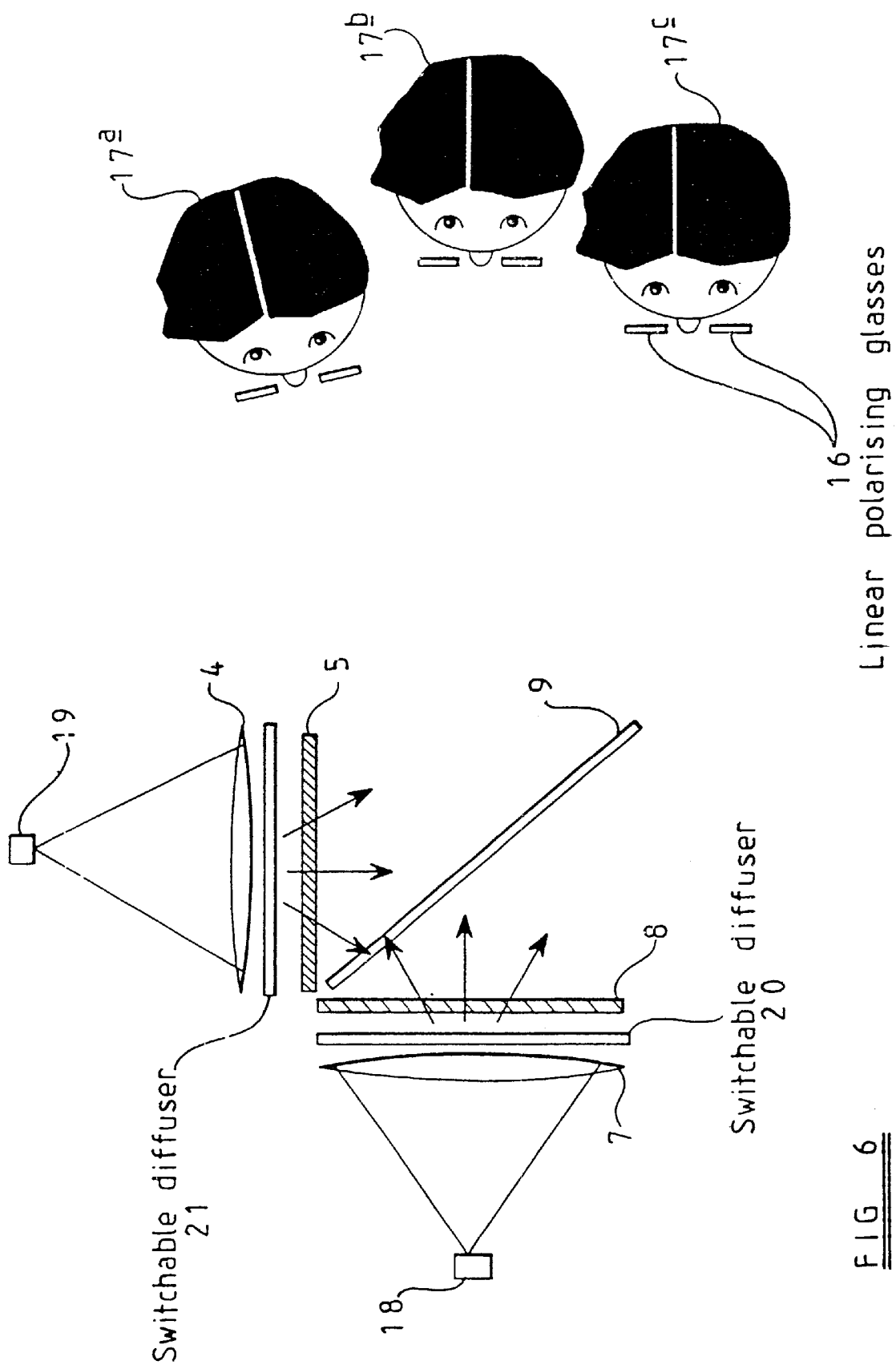
FIG. 6 is a diagrammatic view of a 3D display constituting a second embodiment of the invention.

FIG. 6 shows a 3D display of a type similar to that shown in FIG. 1. In particular, the display comprises the same lenses 4 and 7, LCD panels 5 and 8, and beam combiner 9. However, the illuminator 1, the beam splitter 2, and the mirrors 3 and 6 of FIG. 1 are replaced by illuminators 18 and 19. In the autostereoscopic mode, the display of FIG. 6 operates in the same way as that of FIG. 1.

The display of FIG. 6 further comprises switchable diffusers 20 and 21, for example polymer dispersed liquid crystal type material panels. The diffuser 20 is disposed between the lens 7 and the panel 8 and the diffuser 21 is disposed between the lens 4 and the panel 5. In the autostereoscopic mode, the diffusers 20 and 21 are controlled so as not to diffuse light passing through the lenses 4 and 7 and the LCD panels 5 and 8.

In the stereoscopic mode, the diffusers 20 and 21 are controlled so as to diffuse light so that the illuminators 18 and 19 are no longer imaged at the observer by the lenses 4 and 7. The panels 5 and 8 transmit light with the same relatively perpendicular polarisations as the panels 5 and 8 in FIG. 5 and the observer has to wear spectacles 16 with corresponding linear polarising filters so as to see the 3D image. The observers thus have a much greater freedom of movement and can view the 3D image throughout an extended region. However, because light from the illuminators 18 and 19 is no longer imaged by the lenses 7 and 4, respectively, but is diffused by the diffusers 20 and 21, respectively, the 3D image is less bright in the stereoscopic mode than in the autostereoscopic mode. It may be possible to reduce the reduction in brightness by increasing the source brightness when switching to the stereoscopic mode.

The 3D display shown in FIGS. 7 and 8 differs from that shown in FIG. 6 in that the illuminators 18 and 19 are replaced by compact extended illuminators. The illuminator 18 comprises an array of light sources 22 disposed behind an array 23 of lenses, such as a lenticular screen or a microlens array. The illuminator 19 is likewise replaced by an array of illuminators 24 and an array 25 of lenses. As shown in FIG. 7 in the autostereoscopic mode of the display, the arrays 23 and 25 of lenses are arranged to image the illuminators 22 and 24 at the right and left eyes, respectively, of the observer 10. The display thus operates in the same way as the display shown in FIG. 1.

In the stereoscopic mode, the diffusers 20 and 21 are controlled so as to diffuse light from the illuminators. Light passing through the LCD panels 5 and 8 is linearly polarised with relatively perpendicular directions of polarisation and, instead of being imaged at the eyes of the observer, is supplied to an extended region throughout which the observer wearing the polarised spectacles 16 can see the 3D image.

FIG. 9 shows a 3D display of a type similar to that shown in FIGS. 7 and 8. However, the arrays 22 and 24 of separated illuminators are replaced by arrays 26 and 27 of contiguous illuminators, for example LCDs on extended backlights. The illuminators are arranged as groups of illuminators with the groups being disposed behind respective lenses of the arrays 23 and 25. In the display shown in FIG. 9, each group comprises two illuminators. However, the groups may each comprise more than two illuminators. Further, the switchable diffusers 20 and 21 are not required in the display of FIG. 7.

In the autostereoscopic mode, one illuminator of each group in the arrays 26 and 27 is illuminated and imaged by the arrays 23 and 25 of lenses at the right and left eyes of the observer within a limited viewing region. The display of FIG. 9 thus functions in the same way as illustrated in FIG. 7. However, in the stereoscopic mode, all of the illuminators of the arrays 26 and 27 are illuminated so that the arrays 23 and 25 of lenses image the illuminators throughout an extended viewing region. Observers wearing suitably polarised spectacles 16 may therefore view the 3D image throughout an extended viewing region and the brightness of the 3D image is reduced substantially only by the imperfect transmission of the polarisers of the spectacles 16.

The displays shown in FIGS. 5 to 9 rely on the polarising properties of the polarising filters of the spectacles 16, namely the transmission of light polarised in the direction of polarisation of each filter and the substantially complete attenuation of light polarised perpendicularly thereto. However, if the observer tilts his head about a horizontal axis, an increase in cross-talk occurs between the left and right images. Such an increase is likely to cause visual fatigue in the observer. For instance, in the display shown in FIG. 8, the polarising filter in front of the left eye of the observer only blocks light passing through the LCD panel 8 when the direction of polarisation of the filter is substantially perpendicular to the direction of polarisation of light from the panel 8. Similarly, the polariser for the right eye only blocks light from the panel 5 when its direction of polarisation is substantially perpendicular to the direction of polarisation of light from the panel 5. When the observer tilts his head, the respective filters are no longer substantially perpendicular to the light coming from the panels. Also, because the direction of polarisation of the left polariser is no longer substantially parallel to the polarisation of light from the panel 5 and similarly for the right polariser and the panel 8, the left and right views are somewhat attenuated. Thus, the left view becomes at least partially visible to the right eye, the right view becomes at least partially visible to the left eye, and the 3D effect is reduced or eliminated.

In order to avoid this disadvantage, circularly polarised light may be used instead of linearly polarised light. FIG. 10 shows a display of the type shown in FIGS. 7 and 8 further comprising quarter wave plates 28 and 29 disposed between the beam combiner 9 and the LCD panels 8 and 5, respectively. The quarter wave plates 28 and 29 convert the linearly polarised light from the panels 8 and 5 to circularly polarised light of opposite handedness. Similarly, the analyzer glasses 30 comprise quarter wave plates 32 and linear polarisers 31. The polariser 31 and the quarter wave plate 32 for the left eye are arranged to pass light from the LCD panel 5 and the quarter wave plate 29 while substantially blocking light from the panel 8 and the quarter wave plate 28. Similarly, the quarter wave plate 32 and the polariser 31 for the right eye are arranged to pass light from the panel 8 and the quarter wave plate 28 while substantially blocking light from the panel 5 and the quarter wave plate 29. Because the light from the display is circularly polarised in opposite directions for the left and right views, tilting of the head of the observer does not result in any change in cross-talk between the left and right views.

The quarter wave plates 28 and 29 and the analyzer glasses 30 may be used with the other displays shown in FIGS. 5 to 9 so as to avoid or reduce cross talk caused by tilting of the head of the observer.

Beam combiner displays using compact illuminator arrangements, for instance as shown in FIG. 10, may be embodied as portable displays for ease of transportation. The backlights may be made relatively thin to allow the display to be collapsed, for instance by connecting the elements together by means of a hinge arrangement at the region indicated at 100 in FIG. 10. The display may then be folded "flat" for convenience of transportation. Such a display may be more convenient for use with "notebook" type computers or other portable instruments.

The 3D display shown in FIGS. 11 and 12 differs from the displays shown in FIGS. 5 to 10 in that a single pixellated LCD panel 39 is provided together with a pair of polarised illuminators 35 and 36. The pixels of the panel 39 are arranged as two groups which are interlaced with each other and which display the left and right images. The pixels of one group supply light having a first direction of linear polarisation whereas the pixels of the other group supply light having a second direction of linear polarisation substantially perpendicular to the first direction. The illuminator 35 supplies light which is linearly polarised in a direction such as to be transmissible by the first group of pixels of the panel 39 whereas the illuminator 36 supplies light polarised so as to be transmissible by the second group. Light from the illuminators 35 and 36 is imaged by a lens 37 through a switchable diffuser 38 and the pixellated LCD panel 39 at regions where the right and left eyes, respectively, of the observer 10 are located. Thus, with the diffuser 38 switched so as not to diffuse the light, as shown in FIG. 11, the viewer 10 sees an autostereoscopic 3D image in a limited viewing region.

In the stereoscopic mode as shown in FIG. 12, the switchable diffuser 38 is arranged so as to diffuse and depolarise light from the illuminators 35 and 36. The observer wears polarising spectacles 16 and can thus see the stereoscopic 3D image throughout an extended viewing region.

The display shown in FIG. 13 differs from that shown in FIG. 12 by the provision of a quarter wave plate 40 in front of the panel 39 and by the use, in the stereoscopic mode, of the analysing glasses 30 in place of the spectacles 16. The display of FIG. 13 thus substantially avoids problems of increased cross-talk between left and right images when the observer tilts his head.

The display shown in FIG. 14 is of the same type as that shown in FIG. 13 but in which the two polarised illuminators 35 and 36 and the lens 37 are replaced by a plurality of polarised illuminators 41 and an array 42 of microlenses. The illuminators 41 comprise an array of illuminator pairs with mutually perpendicular linear polarisations and the array 42 of microlenses is arranged to image the illuminators providing light of the first polarisation at the left eye of the observer and to image the illuminators supplying light of the perpendicular polarisation at the right eye of the observer.

The display shown in FIG. 14 thus functions in the autostereoscopic and stereoscopic modes in the same way as the display shown in FIG. 13.

The panel 39 may comprise a spatial light modulator of any of the types disclosed in British Patent Applications Nos. 9425607.0 and 9521054.8. FIG. 15 illustrates two pixels 60 and 61 of such an SLM39. The SLM39 comprises substrates 62 and 63 defining a cell containing a liquid crystal 64. Crossed polarisers 65 and 66 having orthogonal directions of polarisation are disposed on opposite sides of the liquid crystal 64. A 90° polarisation rotator 67, for instance in the form of a half waveplate, is disposed between the substrate 62 and the polariser 65 for the pixel 60 whereas a compensation plate and optional colour filter 34 is disposed between the substrate 62 and the polariser 65 for the pixel 61. A compensation plate and optional colour filter 69, similar to the plate 68, is disposed between the substrate 63 and the polariser 66 for the pixel 60. A 90° rotator 70, similar to the rotator 67, is disposed between the substrate 63 and the polariser 66 for the pixel 61.

Light incident from the left on the pixel 60 has its polarisation rotated by 90° by the rotator 67. The polariser 65 passes light having a first polarisation direction from the rotator 67 so that input light having the direction of polarisation indicated by the dots in FIG. 15 enters the liquid crystal 64 of the pixel 60. When the pixel 60 is in a light transmissive state, light having the linear polarisation indicated by the dot is passed by the polariser 66 and output as shown at 71 through the compensation plate 69, which has substantially no effect on the polarisation.

For the pixel 61, light having the polarisation indicated by the arrows is passed by the polariser 65 into the liquid crystal 64. When the pixel 61 is in the light-transmissive state, the polariser 66 outputs light having the polarisation indicated by the dot. The polarisation of the output light is rotated by 90° by the rotator 70 so that the output light 72 from the pixel 61 has a direction of polarisation which is orthogonal to the output light from the pixel 60.

FIGS. 16*a* and 16*b* illustrate a display which comprises a switchable light source 50 arranged to emit light through a lens 51 to a SLM in the form of a liquid crystal device (LCD) 52 which is capable of switching at high speed.

In the mode of operation illustrated in FIG. 16*a*, the light source 50 is arranged such that discrete regions 50*a*, 50*b* thereof are illuminated in an alternating manner. When region 50*a* is illuminated, the light emitted thereby is imaged by the lens 51 so that the "left" image displayed by the LCD 52 is viewable by the left eye of an observer 53. On switching the region 50*a* off, the display of the LCD 52 is altered to display the "right" image and region 50*b* is illuminated, permitting the right image to be viewed by the right eye of the observer 53. By switching the light source 50 and LCD 52 at a sufficiently high speed and by controlling the LCD 52 such that the left one of a stereoscopic pair of images is displayed when the region 50*a* is illuminated, and the right one is displayed when the region 50*b* is illuminated, an autostereoscopic image is viewed by the observer 53.

By either moving the light source 50 or adjusting the positions of the illuminated regions 50*a*, 50*b* thereof, the display device can be made to track the observer. Further, by adjusting the displayed image depending upon the position of the observer, a look around facility can be provided.

If the whole of the light source 50 is illuminated, the lens 51 no longer forms images viewable from discrete positions, the field of view being of increased size. In order to permit the viewing of a stereoscopic image, the LCD 52 displays the left and right images of the stereoscopic pair in an alternating manner. The observer 53 wears spectacles 54 including switchable shutters which are controlled such that, when the left image is displayed, the observer's left eye is able to see the image, whereas the shutter obscures the view of the right eye. Conversely, when the right image is displayed, the respective shutter obscures the view of the observer's left eye whereas the right eye is able to see the image. In one convenient type of switchable shuttered spectacles 54, each lens thereof includes a liquid crystal device which is controllable between a substantially transparent mode and a substantially opaque mode. In order to use such spectacles with the FIG. 16*b* mode of operation to view a stereoscopic image, the shutters of the spectacles must be controlled so as to operate synchronously with the LCD 52.

The embodiment illustrated in FIGS. 17a and 17b is similar to that of FIGS. 16a and 16b, the device further comprising a polarisation modulator 55 which in the autostereoscopic mode (FIG. 17a) is deactivated and has little or no effect on the viewed images. Operation in this mode is as described with reference to FIGS. 16a In the stereoscopic mode (FIG. 17b), the polarisation modulator 55 is operated so as to modulate the polarisation of the light transmitted by the LCD 52 such that, when the image intended for one of the observer's eyes is displayed, the polarisation is modulated so as to take a first polarisation type whereas, when the image intended for the other of the observer's eyes is displayed, the polarisation is modulated so as to be of a second, orthogonal polarisation type. As illustrated, the observer 53 wears spectacles 56 having polarisers of orthogonal polarisations, one of the lenses being arranged to transmit light of the first polarisation type and the other being arranged to transmit light of the second polarisation type. Thus, each eye of the observer only sees the appropriate image displayed by the LCD 52.

In one convenient mode of operation, the polarisation modulator 55 is arranged to modulate the direction of plane polarisation of the light transmitted by the LCD 52 by 45° in one direction when one image is displayed, and 45° in the opposite direction when the other image is displayed.

In order to avoid cross-talk, circular polarisation may be used instead of plane polarization as described hereinbefore.

Both FIGS. 16a and 16b and FIGS. 17a and 17b illustrate operation with a single observer 53. In the autostereoscopic modes (FIGS. 16a and 17a), more observers may be accommodated by providing further light sources or regions in order to produce the respective image positions. Further observers may be accommodated in the stereoscopic modes (FIGS. 16b and 17b) simply by the addition of extra viewing spectacles, one pair for each observer.

The light source 50 and the lens 51 in each of the embodiments disclosed in FIGS. 16a, 16b, 17a, and 17b may be replaced by a compact light source comprising an extended backlight and a lens array.

In each case, by tracking the position of the observer and adjusting the displayed images in accordance with the observer's position, a look around facility may be provided.

It is thus possible to provide a 3D display which is capable of functioning in both an autostereoscopic mode and a stereoscopic mode so as to make use of the specific advantages available in the two modes. In the autostereoscopic mode, although the freedom of movement of the observer may be limited without incurring the cost and complexity of observer tracking systems, the observer does not have to wear any viewing aids and a relatively bright 3D image is visible. In the stereoscopic mode, although the 3D image may be less bright and the observer has to wear a viewing aid, the observer has a much greater freedom of movement and several observers may simultaneously view the 3D image.

In each of the displays described hereinbefore, cross-talk can occur between the left and right images. Cross-talk results from the left image being partially visible to the right eye of the observer and vice versa. Such cross-talk can be distracting to the observer and can result in visual fatigue.

In the autostereoscopic mode, cross-talk can be caused by a number of mechanisms. For instance, lens abberations, scattering of light by the LCDs and the lenses, and poor illuminator contrast can result in cross-talk.

In the stereoscopic mode in which the visibility of the left and right images is controlled by spectacles having polarising filters, cross-talk can occur as a result of poor "extinction" of the polarising filters and of the polarisers in the LCD panels. "Extinction" is the ability of a polariser to attenuate light having a polarisation orthogonal to the polarisation direction of the polariser. Also, in the stereoscopic mode, any depolarisation which occurs between the panels and the spectacles will increase the cross-talk. As described hereinbefore for embodiments using linear polarisation, as the observer tilts his head, the linear polarising filters in the spectacles become misaligned with the polarisation of light from the display so that cross-talk increases. Although this can be largely avoided using circular polarisation, spectral variations may occur when an observer wearing circularly polarised filters tilts his head, again resulting in cross-talk.

In order to reduce cross-talk, the displays shown in the drawings may be operated in the autostereoscopic mode with the observer wearing the viewing aid intended for use in the stereoscopic mode. For instance, when the display shown in FIG. 5 is operated in the autostereoscopic mode, the observer can wear the polarising spectacles 16. The extinction effect of the polarising spectacles 16 is such that the left image light which, because of cross-talk, would otherwise be visible to the right eye is attenuated by the polarising filter in front of the right eye of the observer, and vice versa Thus, the cross-talk is further reduced and is less than that which occurs in the autostereoscopic mode without the use of the viewing aid and in the stereoscopic mode The displays shown in FIGS. 5 to 14, 17a and 17b all provide light intended for the left and right eyes which is orthogonally polarised. In each case, when the display is operated in the autostereoscopic mode, the cross-talk is reduced by means of the observer viewing aid.

The embodiment shown in FIGS. 16a and 16b relies, in the stereoscopic mode, on spectacles 54 having shutters which are switched in synchronism with the left and right images displayed by the LCD 52. In the autostereoscopic mode illustrated in FIG. 16a, cross-talk may still occur because of the mechanisms described hereinbefore. Again, by using the switching shutter spectacles 54 in the autostereoscopic mode, cross-talk in the autostereoscopic mode can be substantially reduced. Cross-talk may also be less than in the stereoscopic mode, which relies on the amount of attenuation provided by each shutter when switched so as to block light, i.e. the contrast ratio between the "transparent" and "opaque" shutter states.

When using the viewing aid in the autostereoscopic mode so as to achieve particularly low cross-talk, the freedom of movement of the observer is limited to that which is normally available in the autostereoscopic mode. However, in the case of observer tracking displays of the type shown in FIG. 2, the freedom of movement may be substantially improved compared with non-tracking displays. This may be advantageous for some applications where the cost and complexity of providing an observer tracking system is justified.

FIG. 18 shows a compact programmable plane polarised light source suitable for use in various of the displays disclosed hereinbefore, for instance to provide a switchable polarised backlight. The polarised light source comprises a source 90 of non-polarised light arranged to transmit light towards a polarising plate 91. The polarising plate 91 is substantially transparent to plane polarised light of a first polarisation and substantially opaque to plane light having a polarisation axis perpendicular to the first polarisation. Light from the polarising plate 91 is incident upon a liquid crystal device which comprises a first glass substrate 93 carrying a first electrode and alignment layer, a liquid crystal layer 92 and a second glass substrate 94 carrying a second electrode and alignment layer. The liquid crystal layer 92 may comprise a layer of twisted nematic (TN) or ferroelectric liquid crystal material or may form a pi-cell. The electrodes may be arranged so as to divide the light source into a plurality of independently controllable individual light source elements.

Operation of the light source using a TN layer will now be described. In use, the electrodes are used to switch the liquid crystal layer 92 between its fully driven state and its fully undriven state. In its driven state, the plane polarised light transmitted by the polarising plate 91 passes through the liquid crystal layer 92 without having its axis of polarisation altered by the liquid crystal material. In the undriven state, the axis of polarisation of the light passing through the liquid crystal layer 92 is rotated by 90°, the transmitted light having a polarisation axis perpendicular to the light incident on the liquid crystal device.

By suitably controlling the liquid crystal device, the device can be used to produce, for instance, two sources of polarised light, the polarisation axes of which are perpendicular to one another.

What is claimed is:

1. A three dimensional display, comprising:

an imaging system; and at least one illumination system arranged to illuminate a first limited region of space in which a three dimensional image is viewable in an autostereoscopic mode and a second region of space which is extended with respect to the first region and in which the three dimensional image is viewable in a stereoscopic mode, wherein the three dimensional display is switchable between the autostereoscopic mode and the stereoscopic mode, and wherein the imaging system comprises first and second spatial light modulators, and a beam combiner for combining light from the first and second spatial light modulators.

2. A three dimensional display, comprising:

an imaging system; and at least one illumination system arranged to illuminate a first limited region of space in which a three dimensional image is viewable in an autostereoscopic mode and a second region of space which is extended with respect to the first region and in which the three dimensional image is viewable in a stereoscopic mode, wherein the three dimensional display is switchable between the autostereoscopic mode and the stereoscopic mode, and wherein the at least one illumination system comprises an extended light source including a plurality of substantially contiguous elements, such that M of the contiguous elements is or are selectively illuminated in the autostereoscopic mode, and N of the contiguous elements are selectively illuminated in the stereoscopic mode, where N and M are integers and N is greater than M.

* * * * *